з,283,521
Patented Nov. 8, 1966

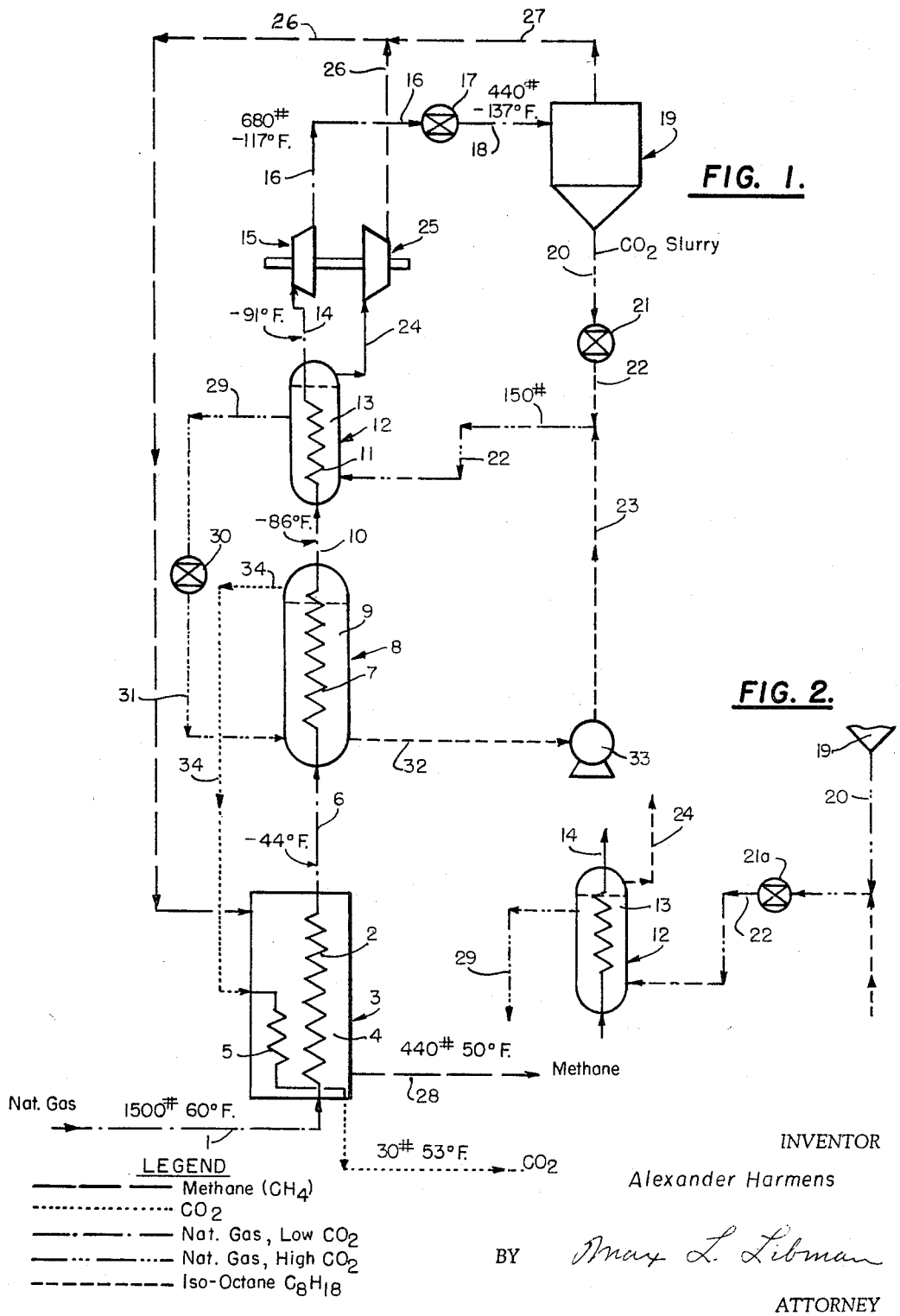

3,283,521
SEPARATION OF A GASEOUS MIXTURE CONTAINING A SOLIDIFIABLE CONTAMINANT
Alexander Harmens, Purley, Surrey, England, assignor to Conch International Methane Limited, Nassau, Bahamas, a Bahamian company
Filed Apr. 9, 1964, Ser. No. 358,420
Claims priority, application Great Britain, June 7, 1963, 22,778/63
11 Claims. (Cl. 62—12)

This invention concerns the separation of a gaseous mixture, especially the separation of a contaminant from a gaseous feedstream. The invention is an improvement in and modification of the invention claimed in Canadian Patent No. 638,367.

Canadian Patent No. 638,367 provides a method of removing a component from a fluid stream which comprises removing one of the components as a solid by cooling the feedstream; recovering the solid; mixing the recovered solid with a carrier medium; and passing the solid and carrier medium in heat exchange with the incoming fluid feedstream, thereby causing a phase change in the solid and cooling of the feedstream. The method can comprise cooling the incoming fluid stream under an elevated pressure sufficient to form a liquid phase and a solid phase; separating the liquid phase and solid phase; recovering the liquid phase as a product of the method; mixing the separated solid phase with a liquid carrier medium; and heat exchanging the solid phase and carrier medium with the incoming fluid stream whereby the solid phase is vaporized and the fluid stream is cooled. In this adaptation, the method can, for example, be applied to a fluid stream containing methane as the principal component and carbon dioxide as a minor component.

According to the present invention, a method of separating a contaminant from a gaseous feedstream to obtain gaseous product lean in the contaminant and separated gaseous contaminant comprises:

(a) Cooling the gaseous feedstream by indirect heat exchange with a slurry of the solidified contaminant in a liquid carrier medium;

(b) Further cooling the gaseous feedstream by indirect heat exchange with a slurry of the solidified contaminant in liquefied gas and the liquid carrier medium;

(c) Reducing the pressure on the gaseous feedstream to obtain gaseous product lean in the contaminant and a slurry of the solidified contaminant in liquefied gas;

(d) Either reducing the pressure on the slurry of the solidified contaminant from (c) and then mixing it with a liquid carrier medium to obtain a slurry of the solidified contaminant in both the liquefied gas and the liquid carrier medium, or mixing the slurry of the solidified contaminant from (c) with a liquid carrier medium to obtain a slurry of the solidified contaminant in both the liquefied gas and the liquid carrier medium and then reducing the pressure on it;

(e) Using the resultant slurry from (d) to effect the cooling in (b), and thereby obtain both more gaseous product lean in the contaminant but at a lower pressure and a slurry of the solidified contaminant in the liquid carrier medium;

(f) Reducing the pressure on the slurry of solidified contaminant from (e); and (g) Using the slurry of solidified contaminant from (f) to effect the cooling in (a), and thereby obtain separated gaseous contaminant and liquid carrier medium.

Like the main invention, the present invention enables a gaseous feedstream containing a contaminant to be purified. However, the present invention combines the advantages of continuous operation with those of obtaining larger proportions of the purified gas, namely the gas lean in the contaminant.

Before effecting the stage (a), the gaseous feedstream can be cooled by indirect heat exchange partly with the gaseous product lean in the contaminant and partly with the separated gaseous contaminant. Preferably, this pre-cooling is effected by using a suitable mixture of gaseous product from stages (c) and (e). The mixture is conveniently obtained by compressing the gaseous product from the stage (e) to the pressure of the gaseous product from stage (c), and mixing the compressed gaseous product with that from stage (c).

The separated liquid carrier medium obtained in stage (g) is preferably recycled to the missing stage in step (d). In the practice of the present invention, any make-up liquid carrier medium required can be added at any suitable stage of the carrier liquid cycle.

The liquid carrier medium (as indicated in Canadian Patent No. 638,367) must have a freezing point low enough so that it will not freeze in the practice of the invention, and its vapour pressure must be such that the loss as vapour will not be excessive, for example in the evaporation stage (e) and especially in the evaporation stage (g). The particular liquid carrier medium used will depend on the conditions and starting material used. Examples of liquid carrier media suitable for use when carbon dioxide or hydrogen sulphide is to be removed from natural gas are propylbenzene and isooctane.

The present invention is particularly suitable for separating natural gas (which consists principally of methane) containing an acidic component. Examples of such acidic components are carbon dioxide and hydrogen sulphide. In the case of natural gas containing carbon dioxide, the present invention will most advantageously be used for natural gas containing a maximum about 15 mole percent carbon dioxide, because with higher concentrations of carbon dioxide the initial pressure of the natural gas feedstream will have to be so great that it will no longer be economical to use the present invention.

As disclosed above, the purified gas of the present invention is lean in the contaminant. In the case where the contaminant is an acidic contaminant, the contaminant can be completely removed by the method claimed in our copending U.S. patent application, Ser. No. 300,744, filed August 8, 1963.

The present invention will now be illustrated by the following example, in which reference will be made to the accompanying drawing, in which:

FIG. 1 is a flow diagram of the invention; and
FIG. 2 shows an alternative form of one step of the invention.

EXAMPLE

Dry natural gas under pressure of 1,500 p.s.i.a. and at a temperature of 60° F. consisting of methane, 88.8 mole percent, and carbon dioxide, 11.2 mole percent, enters the system via a gas line 1 and passes into a coil 2 of a heat exchanger 3. In the coil 2, the gaseous mixture is cooled to a temperature of −44° F. by indirect heat exchange partly with pure gaseous methane in the shell space 4 of the heat exchanger and partly by indirect heat exchange with gaseous carbon dioxide in a further coil 5 in the heat exchanger.

The gaseous mixture of methane and carbon dioxide in the coil 2 of the heat exchanger 3 passes therefrom via a gas line 6 into a coil 7 inside a carbon dioxide evaporator 8. In the coil 7, the gaseous mixture is cooled to a temperature of −86° F. by indirect heat exchange with a slurry of carbon dioxide crystals in liquid isooctane in the shell space 9 of the evaporator as described below.

The gaseous mixture of methane and carbon dioxide in the coil 7 of the carbon dioxide evaporator 8 passes therefrom via a gas line 10 into a coil 11 inside a methane evaporator 12. In the coil 11, the gaseous mixture is cooled to a temperature of $-91°$ F. by indirect heat exchange with a slurry of carbon dioxide crystals in liquid isooctane and liquefied methane in the shell space 13 of the evaporator as described below.

The gaseous mixture of methane and carbon dioxide in the coil 11 of the methane evaporator 12 passes therefrom via a gas line 14 into an expansion engine 15 for simultaneously reducing the pressure and temperature of the gaseous mixture and producing power. The gaseous mixture passes from the expansion engine 15 into a gas line 16 under a lower pressure of 680 p.s.i.a. and at a lower temperature of $-117°$ F. The gaseous mixture then passes through a reduction valve 17 into a short gas/liquid/solid line 18 in which there is a lower pressure of 440 p.s.i.a. As a result of the reduction in pressure, the mixture is cooled to a temperature of $-137°$ F., and passes into the line 18 as a mixture of gas, 85.6 mole percent; liquid, 5.1 mole percent; and crystals of carbon dioxide, 9.3 mole percent. This mixture then passes into a separator 19, in which separation of the mixture into a gaseous top and a liquid/solid bottom product occurs. The top product consists of gaseous methane, 98 mole percent, and gaseous carbon dioxide, 2 mole percent. The bottom product consists of a slurry of carbon dioxide crystals in liquefied methane containing 5 mole percent carbon dioxide, the solid/liquid volumetric ratio being 1:1.

The slurry of carbon dioxide crystals in liquefied methane in the bottom of the separator 19 passes therefrom via a solid-liquid line 20 and a reduction valve 21 into a solid/liquid line 22 in which there is a lower pressure of 150 p.s.i.a. The slurry then immediately mixes with liquid isooctane under a pressure of 150 p.s.i.a. from an incoming branch liquid line 23, and passes into the shell space 13 of the methane evaporator 12. The evaporator 12 is adapted to allow the slurry only a short residence time in it. In the shell space 13, the methane in the slurry is vaporized by indirect heat exchange with the mixture of methane and carbon dioxide in the coil 11 in the evaporator 12 thereby cooling said mixture as indicated above. A slurry of carbon dioxide crystals in liquid isooctane then forms underneath the resultant gaseous methane which is lean in carbon dioxide and collects in the top part of the shell space 13. Alternatively, the reduction valve can be placed in line 22, as shown at 21a in FIG. 2, to effect reduction in pressure of the total mixture.

The gaseous methane containing carbon dioxide (which is under a pressure of 150 p.s.i.a.) in the shell space 13 of the methane evaporator 12 passes therefrom via a gas line 24 into a compressor 25 driven by the expansion engine 15. The gaseous methane then passes from the compressor 25 into a gas line 26, in which it mixes with a mixture of gaseous methane and carbon dioxide from an incoming branch gas line 27. The gaseous mixture entering the line 26 from the line 27 is the top product in the separator 19, which passes therefrom into the line 27. The resultant gaseous mixture obtained in the line 26 is leaner in carbon dioxide and consists of methane with less than 2.5 mole percent dioxide. This mixture passes along the line 26 into the shell space 4 of the heat exchanger 3. In the shell space 4, the gaseous mixture cools the gaseous mixture of methane and carbon dioxide in the coil 2 inside the heat exchanger 3 as indicated above. The gaseous mixture of methane and carbon dioxide in the shell space 4 then passes into an output gas line 28 under a pressure of 440 p.s.i.a. and at a temperature of $50°$ F. and leaves the system as product. The small quantity of carbon dioxide in the gas can, if desired, be completely removed by the method claimed in copending U.S. patent application, Serial No. 300,744, filed August 28, 1963.

In such a case, the necessary further equipment can be fitted in the line 26.

The slurry of carbon dioxide crystals in liquid isooctane in the shell space 13 of the methane evaporator 12 passes therefrom into a solid/liquid line 29. The slurry then passes through a reduction valve 30 into a further solid/liquid line 31 in which there is a lower pressure of 30 p.s.i.a. The slurry then enters the shell space 9 of the carbon dioxide evaporator 8. In the shell space 9, the carbon dioxide in the slurry is vaporized by indirect heat exchange with the gaseous mixture of methane and carbon dioxide in the coil 7 in the evaporator 8, thereby cooling said mixture as indicated above. Clear liquid isooctane then accumulates under the resultant gaseous carbon dioxide which collects in the top part of the shell space 9. The liquid isooctane is pumped out of the shell space 9 into a liquid line 32 by a pump 33 and then passes via the pump 33 into the line 23 under a pressure of 150 p.s.i.a., from which it passes into the line 22 as indicated above.

The gaseous carbon dioxide in the top part of the shell space 9 of the carbon dioxide evaporator 8 passes therefrom via a gas line 34 into the coil 5 of the heat exchanger 3, in which it cools the gaseous mixture of methane and carbon dioxide in the other coil 2 in the heat exchanger as indicated above. The gaseous carbon dioxide in the coil 5 then passes from the heat exchanger 3 into an output gas line 35 under a pressure 30 p.s.i.a. and at a temperature of $53°$ F. and leaves the system.

In the above example, connections for introducing the liquid isooctane into the system are not shown, because it can be added at any suitable place in the system. However, in the present application of the invention, the liquid isooctane is initially introduced into the system by way of a suitable connection to the shell space of the carbon dioxide evaporator 8.

It will be apparent that the embodiments shown are only exemplary and that various modifications can be made in construction and arrangement within the scope of the invention as defined in the appended claims.

I claim:
1. A method of separating a contaminant from a gaseous feedstream to obtain gaseous product lean in the contaminant and separated gaseous contaminant, said method comprising:
   (a) cooling the gaseous feedstream in a first evaporative heat exchanger;
   (b) further cooling the gaseous feedstream in a second evaporative heat exchanger;
   (c) reducing the pressure of the gaseous feedstream subsequent to step (b) to obtain at a reduced temperature gaseous products and a slurry of solidified contaminant in liquefied gas;
   (d) passing into the second heat exchanger a mixture of said slurry and a liquid carrier medium, at a pressure reduced below the initial pressure of the slurry, to provide said further cooling of step (b);
   (e) evaporating out in said second heat exchanger gaseous product which is lean in contaminant and at a further reduced pressure, leaving a second slurry of solidified contaminant in the liquid carrier medium;
   (f) passing said second slurry at a reduced pressure into the first evaporative heat exchanger to effect the cooling of step (a) and obtain thereby separated gaseous contaminant and liquid carrier medium.

2. A method as claimed in claim 1, comprising mixing said liquid carrier medium with the first slurry prior to reducing the pressure.

3. A method as claimed in claim 1, comprising the step of reducing the pressure of the slurry prior to mixing it with the liquid carrier medium.

4. A method of separating a contaminant from a gaseous feedstream to obtain gaseous product lean in the contaminant and separated gaseous contaminant, said method comprising:

(a) cooling the gaseous feedstream by indirect heat exchange with a slurry of solidified contaminant in a liquid carrier medium;

(b) further cooling the gaseous feedstream by indirect heat exchange with a slurry of the solidified contaminant in liquefied gas and the liquid carrier medium;

(c) reducing the pressure on the gaseous feedstream to obtain gaseous product and a slurry of the solidified contaminant in liquefied gas;

(d) mixing the slurry of the solidified contaminant from (c) with a liquid carrier medium and supplying this mixture as the slurry of step (b), at a pressure reduced below the pressure of the slurry of step (c);

(e) using the resultant slurry from (d) to effect the cooling in (b), and thereby obtain more gaseous product lean in the contaminant but at a lower pressure and a slurry of the solidified contaminant in the liquid carrier medium;

(f) reducing the pressure on the slurry of a solidified contaminant in the liquid carrier medium from (e); and (g) using the slurry of modified contaminant from (f) to effect the cooling in (a) and thereby obtain separated gaseous contaminant and liquid carrier medium.

5. A method as claimed in claim 4, comprising cooling the gaseous feedstream by indirect heat exchange partly with the gaseous product lean in the contaminant and partly with the separated gaseous contaminant before effecting (a).

6. A method as claimed in claim 5, comprising compressing the gaseous product from (e) to the pressure of the gaseous product from (c); mixing the compressed gaseous product with the gaseous product from (c); and using the resultant mixture to cool the gaseous feedstream before effecting (a).

7. A method as claimed in claim 4, comprising recycling the separated liquid carrier medium from (g) to the mixing step in step (d).

8. A method as claimed in claim 4, in which natural gas containing an acidic contaminant is separated.

9. A method as claimed in claim 4, in which natural gas containing up to 10 mole percent carbon dioxide is separated.

10. A method as claimed in claim 4, in which the pressure on the slurry of the solidified contaminant from (c) is reduced prior to mixing it with the liquid carrier medium.

11. A method as claimed in claim 4, in which the liquid carrier medium is mixed with the slurry of the solidified contaminant from (c), and then the resultant mixture is reduced in pressure.

References Cited by the Examiner

UNITED STATES PATENTS

| | | | |
|---|---|---|---|
| 1,913,805 | 6/1933 | Hausen | 62—23 |
| 2,265,558 | 12/1941 | Ward et al. | 62—23 |
| 2,896,414 | 7/1959 | Tung | 62—23 X |
| 3,130,026 | 4/1964 | Becker | 62—24 X |

NORMAN YUDKOFF, *Primary Examiner.*

V. W. PRETKA, *Assistant Examiner.*